Jan. 16, 1973  J. J. DONNELLY  3,711,372
PROCESS FOR THE PRODUCTION OF MICROBIAL CELLS
Filed July 15, 1970
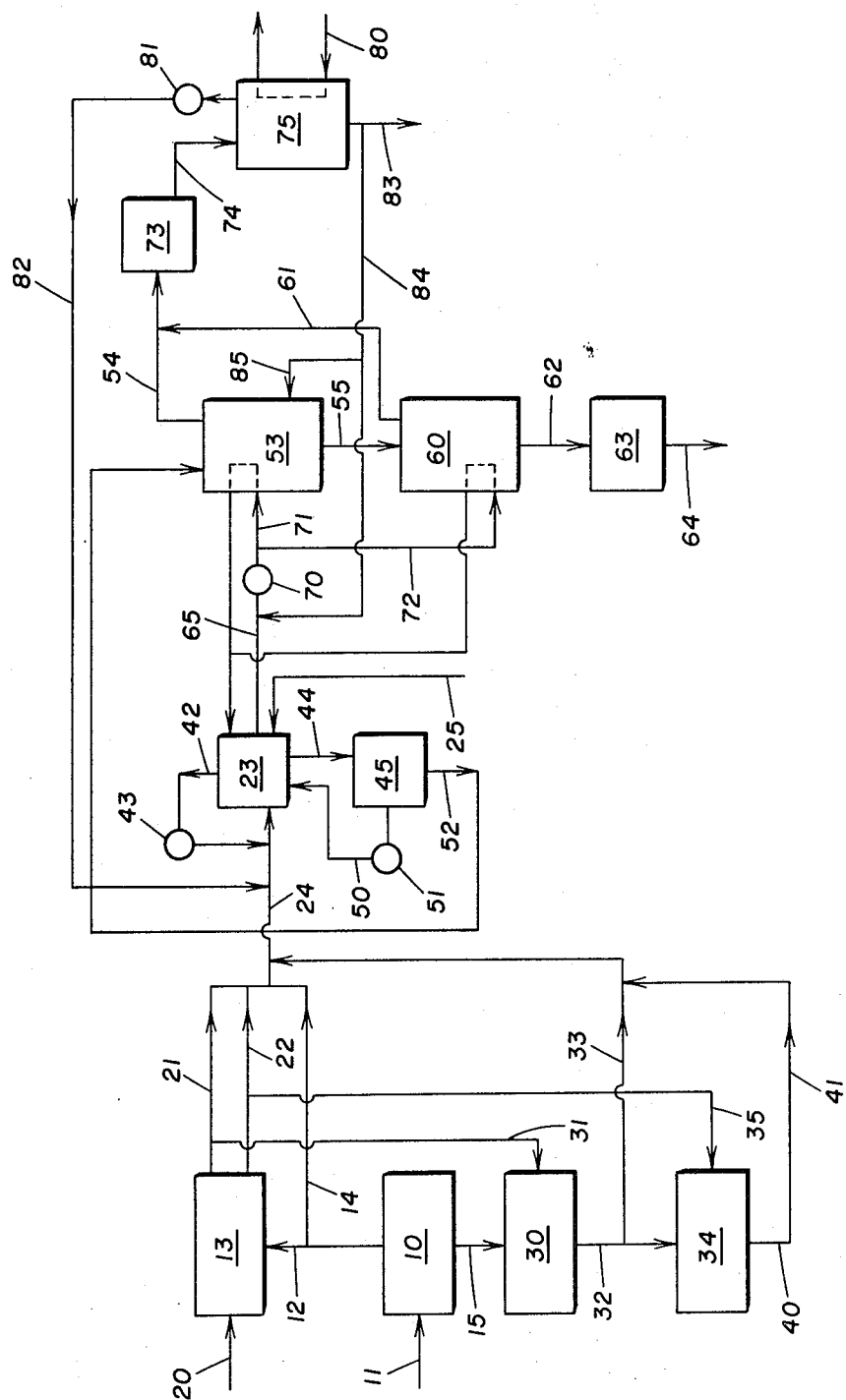
JAMES J. DONNELLY
INVENTOR
BY Frederick E. Dumoulin
ATTORNEY

United States Patent Office 3,711,372
Patented Jan. 16, 1973

3,711,372
PROCESS FOR THE PRODUCTION OF MICROBIAL CELLS
James J. Donnelly, Cinnaminson, N.J., assignor to Mobil Oil Corporation
Filed July 15, 1970, Ser. No. 54,987
Int. Cl. C12b *1/00*
U.S. Cl. 195—1                    19 Claims

ABSTRACT OF THE DISCLOSURE

A process for the production of microbial cells wherein oxygen is separated from air and the oxygen is employed for partial oxidation of hydrocarbonaceous material to produce hydrogen and carbon dioxide. The hydrogen and the carbon dioxide are then employed as a substrate for the growth of microbial cells. The nitrogen obtained as by-product from the oxygen separation is employed to produce ammonia. This ammonia is employed per se to supply at least part of the nitrogen required for growth of the microbial cells. The ammonia may also be employed to form urea by reaction with part of the carbon dioxide obtained by the partial oxidation of the hydrocarbonaceous material and the urea employed to supply at least part of the nitrogen required for growth of the microbial cells. The microbial product is concentrated or dried by one or more stages of evaporation. At least part of the heat produced during growth of the microbial cells is removed by indirect heat exchange between the aqueous liquid culture medium containing the cells and the water vaporizing in the evaporators.

BACKGROUND OF THE INVENTION

Field of the invention

This invention relates to a process for the production of microbial cells and relates more particularly to the growth of microbial cells employing hydrogen and carbon dioxide as a substrate therefor, the substrate being obtained by partial oxidation of a hydrocarbonaceous material.

Description of the prior art

The growth of microbial cells employing hydrogen and carbon dioxide as a substrate is known. Thus, in Bioregenerative Systems, published by the Scientific and Technical Information Division, Office of Technology Utilization, National Aeronautics and Space Administration, 1968, there is described the growth of microbial cells in the presence of oxygen on a substrate of hydrogen and carbon dioxide.

Partial oxidation of a hydrocarbonaceous material to produce hydrogen and carbon dioxide is also well known as is the synthesis of ammonia from hydrogen and nitrogen and the synthesis of urea from ammonia and carbon dioxide.

The growth of microbial cells on a hydrocarbon substrate is also well known. Recently, attention has been given to growth procedures of this sort as a source of low cost, and easily obtainable, protein feed for animals and even for humans. In these procedures, an inoculum of the microbial cells, the substrate, and an aqueous mineral salt medium are mixed in a fermentor to form an aqueous, liquid culture medium. An oxygen-containing gas is introduced into the culture medium and introduction of the oxygen-containing gas is continued throughout the growth procedure. A source of nitrogen is also introduced into the culture medium. Following a suitable time in the fermentor, culture medium is removed from the fermentor and microbial cells are recovered therefrom as product.

SUMMARY OF THE INVENTION

In accordance with the invention, oxygen is separated from air and the oxygen is contacted with a hydrocarbonaceous material under conditions of partial oxidation to produce hydrogen and carbon dioxide. The hydrogen and carbon dioxide are then employed, In the presence of an oxygen-containing gas, as a substrate for the growth of microbial cells in an aqueous, liquid culture medium. The nitrogen obtained as a by-product from the separation of the oxygen from the air is employed as a source of nitrogen for the microbial cell growth procedure. The nitrogen may be employed in the form of ammonia obtained by reaction of the nitrogen with part of the hydrogen obtained by partial oxidation of the hydrocarbonaceous material. It may also be employed in the form of urea obtained by reaction of the ammonia obtained as just described with part of the carbon dioxide obtained by partial oxidation of the hydrocarbonaceous material. The nitrogen may also be employed in the form of both ammonia and urea. In accordance with a specific embodiment of the invention, the microbial cell product is separated from the aqueous, liquid culture medium by subjecting the cell product to one or more stages of evaporation and the evaporative cooling which result is employed at least to help maintain a desirably low temperature during the microbial growth procedure.

BRIEF DESCRIPTION OF THE DRAWING

The drawing is a flow diagram schematically illustrating the process of the invention.

DESCRIPTION OF THE PREFERRED EMBODIMENTS

Referring now to the drawing, air is fed to air separation plant 10 via line 11. In the plant, the air is treated to separate therefrom the oxygen. The separation of the oxygen from air may be effected by any one of several well-known cryogenic procedure. One of these is the modified Linde-Frankl cycle. This cycle, similar to others, involves the liquefaction and subsequent fractionation of air. The air is filtered and compressed to 77 pounds per square inch in a two-stage steam driven centrifugal compressor and then passed through a catalytic oxidation chamber where traces of hydrocarbons such as acetylene are converted to carbon dioxide and water. After cooling, the hydrocarbon free air is passed through a water separator and then through reversing exchangers wherein the air is both cooled and purified. The air entering the exchangers is saturated with water at about 90° F. and 77 pounds per square inch. The air also contains approximately 0.03 mole percent carbon dioxide. As the air is cooled, it progressively deposits first water, then ice, and finally carbon dioxide snow. It leaves the last exchanger at a temperature of −270° F., and passes through activated carbon filters, which remove any remaining carbonaceous impurities. The air stream is then divided into three portions; part of the air, called the "unbalanced" stream, is returned to an extra jacket at the top of the exchangers, where it is warmed to about −120° F., passed through a heat exchanger against nitrogen, and then blended with a second portion of the air stream to give a mix temperature of −244° F. The air stream may be passed through silica-gel dryers and then fed into a turboexpander. In the turboexpander, the air at −244° F. and 77 pounds per square inch is expanded through nozzles against a high speed turbine, which is connected to an electric generator. The air leaves the turbine at its dew point, −305° F. and 7.5 pounds per square inch, and is fed into the upper section of a double-fractionating column.

The third and main portion of the air stream, at a temperature of −270° F., enters the bottom of the double-fractionating column. In the high pressure section, operating at 71.5 pounds per square inch, the air is condensed, and preliminary fractionation takes place. The more volatile nitrogen (B.P. −320.5° F., −195.8° C., or 77.3° K.) rises to the top of the high pressure section, where it is condensed in a condenser-reboiler by heat exchange with boiling oxygen in the low pressure section of the column. The nitrogen, about 94 percent pure, serves as reflux to the trays in the high pressure section and is then withdrawn from the column. After passing through a subcooler where the temperature is reduced by heat exchange with the overhead nitrogen stream from the low pressure section, the liquid nitrogen at about 71 pounds per square inch is expanded through a valve near the top of the low pressure column to 7 pounds per square inch. Here it serves as reflux to the top tray of this section, giving up some of its oxygen and forming nitrogen product.

At the base of the column, so-called rich liquid air, containing about 38 percent of the less volatile oxygen (B.P. −297.4° F., −183° C., or 90.1° K.), is removed and passed through a glass-cloth filter to remove any traces of precipitated carbon dioxide. It is then cooled in a subcooler against the nitrogen gas and fed through an expansion valve at an intermediate point in the low pressure (7 p.s.i.) section of the column. Here it is further fractionated to give oxygen of desired purity and nitrogen product. Reboiler heat is furnished at the bottom of the top section by the condensation of nitrogen at the top of the bottom (high pressure) section. The nitrogen in the top section vaporizes and passes upward through the liquid reflux, which scrubs, to some extent, the oxygen out of the feed stream to give an oxygen yield as high as 90 percent. The oxygen is removed from the air separation plant 10 via line 12, and passed to partial oxidation unit 13. Part of the oxygen is removed from line 12 via line 14. The nitrogen is removed from the air separation plant 10 via line 15.

A hydrocarbonaceous material is fed to the partial oxidation unit 13 via line 20. By hydrocarbonaceous material is meant any material which contains, either in the elemental or molecular state, hydrogen and carbon. Such material may be a hydrocarbon. Thus, the feed to the partial oxidation unit may be a hydrocarbon gas such as methane, ethane, or propane. It may also be a mixture of gases such as natural gas. The feed may also be a heavier hydrocarbon such as butane or pentane or a mixture of heavier hydrocarbons such as naphtha, gasoline, kerosene, gas oil, residual oil, heavy fuel oil, and crude petroleum. Shale oil as well as solid hydrocarbonaceous materials such as coal and coke may also be used.

In the partial oxidation unit 13, the hydrocarbonaceous material is contacted with the oxygen passed to the unit through the line 12 and subjected to partial oxidation conditions. Partial oxidation of hydrocarbonaceous materials is a well-known operation. Therefore, only a general discussion of the operation is considered to be necessary. Basically, the process involves the incomplete combustion of the hydrocarbonaceous feed with relatively pure oxygen. The incomplete combustion supplies the necessary heat for the generation of the hydrogen and carbon dioxide. In a typical partial oxidation operation, the hydrocarbonaceous material is preheated to about 800° F., mixed with superheated steam, and fed into a refractory lined carbon steel reactor. Here the mixture is reacted with oxygen at a temperature ranging between 2000–2700° F., depending upon the amount of steam in the reactor charge. Generally, the process is carried out using 0.3 to 0.6 pound of steam per pound of hydrocarbonaceous feed. The reaction produces some elemental carbon and a raw gas consisting of hydrogen, carbon monoxide, carbon dioxide, and methane. The hot reactor effluent is quenched with water and is then purified.

The purification steps for the converter effluent gas include a shift conversion. This operation comprises reacting the gas in a water gas shift reactor with steam where the carbon monoxide is catalytically converted to carbon dioxide and hydrogen is formed. The hydrogen is removed from the unit 13 through line 21 and the carbon dioxide is removed through line 22.

Growth of the microbial cells is carried out in fermentor 23. In the fermentor, the microbial cells are grown in the presence of an aqueous, liquid mineral nutrient and the hydrogen and carbon dioxide substrate. The growth of the cells requires the presence of oxygen and the presence of a source of nitrogen, as previously explained. The cells may be grown in the fermentor by a batch process or by a continuous process, as desired.

The process of the invention may be employed for the growth of any type of microbial cell that is capable of consuming carbon dioxide as a source of carbon and hydrogen as a source of energy. Thus, for example, the process of the invention may be employed for the growth of cells of the genus Hydrogenomonas. Suitable species include *H. eutropha, H. facilis, H. ruhlandii,* and H. 20. The process of the invention may also be employed for the growth of cells of the alga Scenedesmus.

In the fermentor 23, the required hydrogen, carbon dioxide, and oxygen enter through line 24, the hydrogen, carbon dioxide, and oxygen coming from lines 21, 22, and 14, respectively, connected to line 24. The hydrogen, carbon dioxide, and oxygen are introduced into the fermentor near the bottom portion thereof and at a level below the level of the aqueous, liquid culture medium in the fermentor. Being gaseous, the hydrogen, carbon dioxide, and oxygen pass upwardly through the aqueous, liquid culture medium and effect agitation of the mixture of aqueous, liquid culture medium and the microbial cells, thereby promoting mass transfer of the three gases with the microbial cells and the aqueous, liquid culture medium.

Growth of the microbial cells requires, along with the hydrogen, carbon dioxide, and oxygen, a source of nitrogen, as previously mentioned, and also requires such ions as potassium, magnesium, phosphate and sulfate, as well as trace elements like molybdenum, cobalt and others. Traces of manganese, iron, and calcium may be present. These ions are introduced into the fermentor through line 25 and, along with the water, constitute aqueous, nutrient mineral medium.

The source of nitrogen required for growth of the microbial cells is obtained from the nitrogen remaining after separation of the oxygen from the air in the air separation plant 10. The nitrogen required for growth of the cells may be in the form of ammonia or in the form of urea. Ammonia, as a source of nitrogen for growth of the cells in fermentor 23, is obtained by synthesis employing nitrogen from the air separation plant 10 and hydrogen produced as a result of the partial oxidation of the hydrocarbonaceous material in the partial oxidation unit 13. Urea, as a source of nitrogen for growth of the calls in fermentor 23, is obtained by synthesis employing the ammonia produced as just described and carbon dioxide produced as a result of the partial oxidation of the hydrocarbonaceous material in the partial oxidation unit 13.

The ammonia is synthesized in ammonia manufacturing plant 30 and the synthesis may be effected by any known procedure. Nitrogen is introduced into the plant through line 15 and hydrogen is introduced into the plant through line 31 connected to line 21. In a typical procedure, the hydrogen and nitrogen, in a mole ratio of 3 to 1, are subjected in a reactor to a temperature of about 475° C. and a pressure which may be 300 atmospheres in the presence of an iron oxide catalyst that has been promoted by the addition of small amounts of aluminum oxide and potassium oxide. The gases leaving the reactor are cooled and some of the ammonia liquefies. Part of the gas is purged and the remaining gas is recompressed and recycled. The conversion per pass is approximately 20 to 22 percent and the overall yield with recirculation approaches 85 to 90 percent. The ammonia is removed from the plant through line 32, and, where the ammonia is to supply part or all of the nitrogen requirements for the microbial growth in fermentor 23, the ammonia is passed to the fermentor through line 33 connected between line 32 and line 24.

Where part or all of the nitrogen requirements for the microbial growth in the fermentor 23 are to be provided employing urea, ammonia is passed through line 32 to urea manufacturing plant 34. The urea is synthesized by reacting the ammonia with carbon dioxide and the carbon dioxide enters the plant through line 35 connected to line 22. In this procedure, the ammonia and carbon dioxide, reacting at high temperature and pressure form ammonium carbamate and the latter dehydrates to form urea and water.

In a typical procedure for the synthesis of urea, the ammonia and carbon dioxide, in a weight ratio of about 2.3 to 1 (3 to 1 mole ratio), are compressed to the liquid form and charged separately into a steam-heated, silver-lined reactor. The reactants require about 2 hours to pass through the reactor, which is maintained at a temperature of approximately 190° C. and a pressure of 1,500 to 3,000 pounds per square inch. During this time, the ammonia and carbon dioxide react to form ammonium carbamate, which is largely converted to urea.

The reaction mixture, consisting of about 35 percent urea, 8 percent ammonium carbamate, 10.5 percent water, and 46.5 percent unreacted ammonia, is discharged from the reactor and cooled to approximately 150° C. The melt is passed to an ammonia still, operating at 60° C., where 60 to 65 percent of the uncoverted ammonia and any unreacted carbon dioxide are distilled and collected in an ammonia-absorption system. The residue in the ammonia still, consisting largely of urea and water, is discharged to a crystallizer, where it is cooled to about 15° C. About 70 percent of the remaining free ammonia is removed by vacuum. The resulting slurry is passed to a continuous centrifuge, separating the crystalline urea. The urea is removed from the plant 34 through line 40 and is introduced into fermentor 23 through line 41 connected to line 33.

Returning to the microbial growth procedure in the fermentor 23, conditions are maintained therein conducive to the growth of the microbial cells. For example, with respect to temperature conditions, the aqueous, liquid culture medium may be maintained at 95° F. During the growth procedure, the hydrogen, carbon dioxide, and oxygen pass upwardly through the aqueous, liquid culture medium. The unreacted portion of these gases enter the upper portion of the fermentor above the surface of the aqueous, liquid culture medium and are removed from the fermentor through line 42. These gases are then recycled to the fermentor by means of blower 43 in the line 42 to the fermentor via line 24.

Aqueous, liquid culture medium is removed from the fermentor via line 44 and is passed to decanter 45. In the decanter, separation of the microbial cells from the aqueous, liquid culture medium occurs with the cells settling to the bottom of the aqueous, liquid culture medium. The decanted aqueous, liquid culture medium containing unreacted ammonia or urea, or both, is removed from the upper portion of the decanter and recycled to the fermentor 23 through line 50 by means of pump 51. Aqueous, liquid culture medium, partially concentrated with respect to microbial cells which settled from the medium in decanter 45, is removed from the bottom portion of the decanter through line 52.

Consumption of the hydrogen, carbon dioxide, and oxygen in the course of the microbial growth procedure produces water as a metabolic product. As a result, addition of water to the fermentor to maintain a sufficient quantity thereof for the aqueous, liquid culture medium is not ordinarily required. In this connection, however, sterilized water may be introduced into the fermentor at initiation of the growth procedure to provide aqueous, liquid culture medium to which an inoculum of the microbial cells is added.

The aqueous, liquid culture medium, partially concentrated with respect to microbial cells and removed from the decanter 45 through line 52, is treated for removal of water to obtain, as a product, a concentrated slurry of the microbial cells or the cells in substantially dry form. To effect removal of water, the aqueous, liquid culture medium is passed to a first stage evaporator 53 where it is subjected to evaporation. The evaporator is maintained at a pressure of 0.2 pound per square inch absolute, for example, and, at this pressure, water evaporates from the medium. Evaporation results in lowering of the temperature of the medium and, at 0.2 pound per square inch absolute pressure, the corresponding boiling temperature is 53° F. The vapors resulting from evaporation are removed from the top of the evaporator through line 54 and will be at a pressure of 0.2 pound per square inch absolute and a temperature of 53° F. Not all of the water is evaporated from the culture medium in evaporator 53 and aqueous, liquid culture medium, concentrated with respect to microbial cells as compared to the medium leaving the decanter 45, is removed from the evaporator through line 55.

Since not all of the water was removed from the aqueous, liquid culture medium in the evaporator 53, and where additional water removal is desired, the aqueous, liquid culture medium in line 55 is passed to second stage evaporator 60. In the second stage evaporator, the aqueous, liquid culture medium is again subjected to evaporation. The evaporation in the second stage evaporator may be at the same pressure or at a different pressure than in the first stage evaporator. Assuming that the evaporation in the second stage evaporator is to be at the same pressure as in the first stage evaporator, the evaporation will be at 0.2 pound per square inch absolute and boiling temperature will be 53° F. The vapors resulting from the evaporation are removed from the top of the evaporator through line 61 and are combined with the vapors in line 54 from the evaporator 53.

As previously mentioned, the temperature in fermentor 23 is maintained at a value suitable for the growth of the microbial cells and this temperature may be 95° F. Growth of the microbial cells is an exothermic procedure and to maintain the desired temperature, heat is removed from the aqueous, liquid culture medium in the fermentor. Removal of at least part of the heat is effected by circulation of a portion of the aqueous, liquid culture medium between the fermentor and one or both of the evaporators 53 and 60 and effecting indirect heat exchange between the medium and the fluid in the evaporators. Aqueous, liquid culture medium is removed from the fermentor through line 65 provided with pump 70 and, where heat exchange is to be effected with the liquid in evaporator 53, is pumped through line 71 passing through the evaporator and returned to the fermentor. Passage of the medium through the line passing through the evaporator effects cooling of the medium, the temperature in the evaporator being 53° F. and, typically, the medium can be cooled to a temperature of 89° F. when returned to the fermentor. Cooling of the medium can also be effected, as indicated, in the evaporator 60 and for this purpose the medium can be passed from line 71 through line 72 connected thereto, line 72 passing through the evaporator 60 and returned to the fermentor. The temperature in the evaporator 60 is 53° F. and the medium when returned to the fermentor from this evaporator is typically 89° F.

The vapors from each of the evaporators 53 and 60 enter compressor 73 where they are compressed to a pressure of 2 pounds per square inch absolute, with a resulting rise in temperature to 440° F. The compressed fluids are then passed through line 74 to condenser 75. Cooling water is supplied through line 80 passing through the condenser and serves to cool indirectly the fluids from the compressor. The fluids may be cooled typically to a temperature of 126° F. with cooling water entering the condenser at a temperature of about 70° F. and leaving at a temperature of about 120° F. Noncondensable gases, namely, hydrogen, carbon dioxide, or oxygen, dissolved in, or otherwise accompanying the aqueous, liquid culture medium from the fermentor, are compressed in compressor 81 and returned via line 82 to the fermentor 23. Water resulting from condensation in condenser 75 is removed through line 83.

The aqueous, liquid culture medium in evaporator 60 is maintained therein until such time that it attains a desired water content. The dried product, which may, as indicated previously, be a slurry of the microbial cells or the cells in substantially dry form, is removed from the evaporator 60 through line 62 to pressure equalizing vessel 63. In this vessel, the slurry containing the microbial cells, or the substantially dry microbial cells, is brought up to atmospheric pressure and is then recovered as product of the microbial growth process through line 64.

As stated previously, addition of water to the fermentor 23 to maintain a sufficient quantity thereof for the aqueous, liquid culture medium is not ordinarily required. However, the amount of water removed from the fermentor along with the microbial cells and passed to the decanter 45 may be varied for several reasons. For example, the amount of water may be varied to provide the necessary fluidity for moving the mixture of aqueous, liquid culture medium and the microbial cells from the fermentor to the decanter. If water in excess of that produced by growth of the microbial cells is removed from the fermentor, additional sterilized water may be added to the fermentor. A suitable source of such water is that removed from the condenser 75 and water removed from the condenser may be passed to the fermentor through line 84 connected between line 83 and line 65.

Occasionally, the amount of heat generated in the fermentor 23 is such that the temperature therein may not be maintained at the desired level by evaporation of water from the aqueous, liquid culture medium passed from the fermentor to the two evaporators 53 and 60. In this case, a greater degree of cooling may be effected by increasing the amount of water passed to and evaporated in at least one of the evaporators. Suitable water for this purpose is the water removed from the condenser 75. This water may be passed to evaporator 53 through line 85 connected to line 83. Further, where the desired temperature level cannot be maintained by evaporation of water in the two evaporators, additional cooling means may be employed. For example, a portion of the aqueous, liquid culture medium in line 72 may be passed to an independent refrigeration system, cooled therein, and then recycled to the fermenter 23.

The process of the invention provides particular advantages over conventional procedures for the growth of microbial cells. In various growth processes employing a hydrocarbon as a substrate, the microbial cells are selected with respect to the type or types of hydrocarbon upon which they will grow. However, by employing hydrogen and carbon dioxide as a substrate for the microbial cells, there is no need to isolate a particular, and perhaps scarce, hydrocarbon fraction. Moreover, by employing hydrogen and carbon dioxide rather than a liquid hydrocarbon phase, only three phases are involved, namely, gas, the aqueous, liquid culture medium, and the cells. Thus, there is obtained an improved mass transfer of substrate to the microbial cells, an improved separation of microbial cells from a culture medium which is free of immiscible hydrocarbon, and ease of drying the microbial cell product as opposed to drying microbial cells containing liquid hydrocarbon substrate carried over from the growth procedure. Moreover, the growth procedure is carried out in a closed cycle with return of vapors removed from the upper portion of the fermentor and with return of vapors obtained from the evaporation stages. The vapors are recycled to extinction, and, as a result, there is no discharge of vapors to the atmosphere and no requirement for air pollution control equipment.

Further advantages are obtainable by the procedure of the invention. Thus, evaporation in evaporator 53, and in evaporator 60, permits integration of cooling in the fermentor with concentration of the aqueous, liquid culture medium and drying of the microbial product. Thus, plant location is permitted in areas having high ambient temperatures and drying of the product is carried out at temperatures avoiding deleterious effects on the microbial product.

Other advantages accrue from the use, as a substrate, of hydrogen and carbon dioxide obtained by partial oxidation at high temperatures and the use of oxygen obtained by separation from air, in which separation procedure the air is compressed after filtering. In each of these operations, temperatures are encountered which sterilize the product obtained by the operation. Thus, there is no need of an additional step of sterilizing the oxygen, the substrate, or water since the water in the aqueous, liquid culture medium is obtained as a result of the growth mechanism of the microbial cells or by recirculation of the sterile water discharged from the condenser 75. Of course, where extraneous water is employed for preparing the aqueous, liquid culture medium, the water may be sterilized.

What is claimed is:

1. A process for the production of microbial cells capable of consuming carbon dioxide as a source of carbon and hydrogen as a source of energy comprising separating oxygen from air, contacting a hydrocarbonaceous material with at least a portion of said oxygen under conditions of partial oxidation to produce hydrogen and carbon dioxide, contacting at least a portion of said hydrogen and carbon dioxide in the presence of a portion of said oxygen separated from air with an aqueous, liquid culture medium containing an inoculum of microbial cells capable of utilizing said hydrogen and carbon dioxide for growth and a source of nitrogen, said source of nitrogen being obtained from the nitrogen remaining after the separation of said oxygen from said air, growing said microbial cells in said aqueous, liquid culture medium, and thereafter recovering said microbial cells from said aqueous, liquid culture medium.

2. The process of claim 1 wherein nitrogen obtained from the separation of said oxygen from said air is reacted with hydrogen obtained by said partial oxidation of said hydrocarbonaceous material to produce ammonia and said ammonia is a portion at least of said source of said nitrogen contained in said aqueous, liquid culture medium.

3. The process of claim 1 wherein nitrogen obtained from the separation of said oxygen from said air is reacted with hydrogen to produce ammonia and said ammonia is reacted with a portion of said carbon dioxide produced by said partial oxidation of said hydrocarbonaceous material to produce urea and said urea is a portion at least of said source of said nitrogen contained in said aqueous, liquid culture medium.

4. The process of claim 1 wherein nitrogen obtained from the separation of said oxygen from said air is reacted with hydrogen obtained by said partial oxidation of said hydrocarbonaceous material to produce ammonia, a portion of said ammonia is reacted with carbon dioxide obtained by said partial oxidation of said hydrocarbonaceous material to produce urea, and a portion at least of both said ammonia and said urea is said source of nitrogen contained in said aqueous, liquid culture medium.

5. The process of claim 1 wherein said recovery of said microbial cells from said aqueous, liquid culture medium includes a step of evaporation of water from said aqueous, liquid culture medium.

6. The process of claim 1 wherein said recovery of said microbial cells from said aqueous, liquid culture medium includes a plurality of steps of evaporation of water from said aqueous, liquid culture medium.

7. The process of claim 1 wherein said portion at least of said hydrogen and carbon dioxide is contacted in a fermentor with said oxygen and said aqueous, liquid culture medium containing said source of nitrogen and an inoculum of said microbial cells, a portion of said aqueous, liquid culture medium is removed from said fermentor, microbial cells are recovered from said portion of aqueous, liquid culture medium by subjecting said portion of aqueous, liquid culture medium to at least one step of evaporation of water, and aqueous, liquid culture medium in said fermentor is contacted in indirect heat exchange with said portion of aqeous, liquid culture medium subjected to said evaporation to effect cooling of said aqueous, liquid culture medium in said fermentor.

8. The process of claim 7 wherein said aqueous, liquid culture medium is subjected to two steps of evaporation of water.

9. The process of claim 7 wherein water removed from said aqueous, liquid culture medium by evaporation is condensed and a portion thereof is returned to said fermentor.

10. The process of claim 7 wherein said aqeuous, liquid culture medium is subjected to said at least one step of evaporation of water in an evaporator, said water removed by evaporation from said aqueous, liquid culture medium is condensed, and a portion thereof is returned to said evaporator.

11. The process of claim 10 wherein a portion of said condensed water is returned to said fermentor.

12. The process of claim 1 wherein said portion at least of said hydrogen and carbon dioxide is contacted in a fermentor with said oxygen and said aqueous, liquid culture medium containing said source of nitrogen and an inoculum of said microbial cells by passing said hydrogen, carbon dioxide, and oxygen upwardly through said aqueous, liquid culture medium in said fermentor, unreacted hydrogen, carbon dioxide, and oxygen are removed from said fermentor after passing through said aqueous, liquid culture medium, and said unreacted hydrogen, carbon dioxide, and oxygen are recycled to said fermentor for passage upwardly through said aqueous, liquid culture medium.

13. The process of claim 12 wherein a portion of said aqueous, liquid culture medium is removed from said fermentor, and microbial cells are recovered from said portion of said aqueous, liquid culture medium to at said portion of aqueous, liquid culture medium to at least one step of evaporation of water in an evaporator.

14. The process of claim 13 wherein at least a portion of said water removed by evaporation from said portion of aqueous, liquid culture medium is condensed and returned to said evaporator.

15. The process of claim 13 wherein at least a portion of said water removed by evaporation from said portion of aqueous, liquid culture medium is condensed and returned to said fermentor.

16. The process of claim 13 wherein said water removed by evaporation from said portion of aqueous, liquid culture medium is condensed and a portion is returned to said evaporator and the remainder is returned to said fermentor.

17. The process of claim 13 wherein noncondensable gases are removed from said evaporator and are returned to said fermentor.

18. The process of claim 13 wherein said water removed by evaporation from said portion of aqueous, liquid culture medium is condensed, a portion is returned to said evaporator, the remainder is returned to said fermentor, and noncondensable gases are removed from said evaporator and returned to said fermentor.

19. A process for the production of microbial cells capable of consuming carbon dioxide as a source of carbon and hydrogen as a source of energy comprising:
   (a) separating oxygen from air,
   (b) contacting a hydrocarbonaceous material with a portion of said oxygen separated from said air under conditions of partial oxidation to produce hydrogen and carbon dioxide,
   (c) reacting nitrogen obtained from the separation of said oxygen from said air with a portion of said hydrogen to produce ammonia,
   (d) reacting a portion of said amomnia with a portion of said carbon dioxide to produce urea,
   (e) passing to an aqueous, liquid culture medium contained in a fermentor and containing an inoculum of microbial cells capable of utilizing hydrogen and carbon dioxide for growth, a portion at least of said ammonia and said urea as a source of nitrogen for growth of said microbial cells.
   (f) passing upwardly through said aqueous, liquid culture medium a portion at least of the remainder of said hydrogen and carbon dioxide and a portion at least of the remainder of said oxygen,
   (g) removing from said fermentor unreacted hydrogen, carbon dioxide, and oxygen,
   (h) recycling said unreacted hydrogen, carbon dioxide, and oxygen to said fermentor for passage upwardly through said aqueous, liquid culture medium,
   (i) growing said microbial cells in said aqueous, liquid culture medium,
   (j) removing a portion of said aqueous, liquid culture medium from said fermentor,
   (k) recovering microbial cells from said portion of aqueous, liquid culture medium by subjecting said portion of aqueous, liquid culture medium to at least one step of evaporation of water in an evaporator,
   (l) contacting aqueous, liquid culture medium in said fermentor in indirect heat exchange with said portion of aqueous, liquid culture medium removed from said fermentor and subjected to said at least one step of evaporation to effect cooling of said aqueous, liquid culture medium in said fermentor,
   (m) condensing water removed by evaporation from said portion of aqueous, liquid culture medium in said evaporator,
   (n) returning a portion of said condensed water to said fermentor,
   (o) returning the remainder of said condensed water to said evaporator,
   (p) removing noncondensable gases from said evaporator, and
   (q) returning, said noncondensable gases to said fermentor.

References Cited
UNITED STATES PATENTS 3,420,739    1/1969    Bongers et al. _____ 195—104

OTHER REFERENCES

Brown et al.: "Preliminary Studies on the Extracellular Products of Hydrogenomonas Eutropha" Dev. Indus. Micro. 6: 1965, pp. 223–8.

Repaske: "Nutritional Requirements For Hydrogenomonas Eutropha" J. Bacteriology 83; 1962, pp. 418–422.

A. LOUIS MONACELL, Primary Examiner

J. M. HUNTER, Assistant Examiner

U.S. Cl. X.R.

195—96, 109, 115; 47—1.1

UNITED STATES PATENT OFFICE
CERTIFICATE OF CORRECTION

Patent No. 3,711,372          Dated January 16, 1973

Inventor(s) James J. Donnelly

It is certified that error appears in the above-identified patent and that said Letters Patent are hereby corrected as shown below:

Column 2, line 9, "In" should read --in--;
　　line 42, "procedure." should read --procedures.--

Column 5, line 36, "uncoverted" should read --unconverted--.

Column 9, line 20 (claim 7), "aqeous" should read --aqueous--;

line 54 (claim 13), "to at" should read
　　　　--by subjecting--.

Column 10, line 65 (Reference cited), "1965" should read
　　--1964--.

Signed and sealed this 22nd day of May 1973.

(SEAL)
Attest:

EDWARD M. FLETCHER, JR.　　　　　　　ROBERT GOTTSCHALK
Attesting Officer　　　　　　　　　　Commissioner of Patents